(12) United States Patent
Shapiro et al.

(10) Patent No.: US 10,943,382 B2
(45) Date of Patent: Mar. 9, 2021

(54) VIRTUAL REALITY

(71) Applicant: Sony Interactive Entertainment Inc., Tokyo (JP)

(72) Inventors: Elisheva Shapiro, London (GB); Martin Shenton, London (GB); Martin Echenique, London (GB); Claire Blackshaw, London (GB)

(73) Assignee: Sony Interactive Entertainment Inc.

( * ) Notice: Subject to any disclaimer, the term of this patent is extended or adjusted under 35 U.S.C. 154(b) by 18 days.

(21) Appl. No.: 16/082,338

(22) PCT Filed: Mar. 10, 2017

(86) PCT No.: PCT/GB2017/050648
§ 371 (c)(1),
(2) Date: Sep. 5, 2018

(87) PCT Pub. No.: WO2017/153770
PCT Pub. Date: Sep. 14, 2017

(65) Prior Publication Data
US 2019/0096106 A1   Mar. 28, 2019

(30) Foreign Application Priority Data

Mar. 11, 2016  (GB) .................................... 1604203
Nov. 23, 2016  (GB) .................................... 1619809
Feb. 20, 2017  (GB) .................................... 1702693

(51) Int. Cl.
G06T 13/40   (2011.01)
G06F 3/01    (2006.01)
(Continued)

(52) U.S. Cl.
CPC ............ *G06T 13/40* (2013.01); *A63F 13/211* (2014.09); *A63F 13/213* (2014.09);
(Continued)

(58) Field of Classification Search
None
See application file for complete search history.

(56) References Cited

U.S. PATENT DOCUMENTS 5,732,232 A   3/1998  Brush, II et al.
5,977,968 A   11/1999 Le Blanc
(Continued)

FOREIGN PATENT DOCUMENTS

EP   0659018 A2   6/1995
WO   2014071331 A1  5/2014
(Continued)

OTHER PUBLICATIONS

British Examination Report for Application No. GB1702693.1 dated Jun. 27, 2019, 8 pages.
(Continued)

*Primary Examiner* — Brian M Butcher
(74) *Attorney, Agent, or Firm* — Lerner, David, Littenberg, Krumholz & Mentlik, LLP

(57) ABSTRACT

A virtual reality apparatus includes an image generator configured to generate images representing a user of a virtual environment. The image generator is responsive to selection of a predetermined input by the user. The apparatus also includes a video camera for use in image-based tracking of a user by the image generator. The predetermined input selected by the user is the performing of a predetermined physical gesture in view of the video camera. The image generator is arranged to select a respective emoji responsive to the predetermined physical gesture of the user for display to other users.

16 Claims, 17 Drawing Sheets

(A) neutral,
(B) happy,
(C) sad,
(D) fearful,
(E) angry,
(F) surprised,
(G) disgusted,
(H) happily surprised,
(I) happily disgusted,
(J) sadly fearful,
(K) sadly angry,
(L) sadly surprised,
(M) sadly disgusted,
(N) fearfully angry,
(O) fearfully surprised,
(P) fearfully disgusted,
(Q) angrily surprised,
(R) angrily disgusted,
(S) disgustedly surprised,
(T) appalled,
(U) hatred
(V) awed.

(51) Int. Cl.

| | |
|---|---|
| *G02B 27/01* | (2006.01) |
| *A63F 13/211* | (2014.01) |
| *H04N 7/15* | (2006.01) |
| *A63F 13/213* | (2014.01) |
| *G06F 3/16* | (2006.01) |
| *G06F 3/03* | (2006.01) |
| *A63F 13/428* | (2014.01) |
| *G06F 3/0481* | (2013.01) |
| *G06F 3/0346* | (2013.01) |
| *A63F 13/56* | (2014.01) |
| *A63F 13/215* | (2014.01) |
| *A63F 13/26* | (2014.01) |
| *A63F 13/87* | (2014.01) |
| *G06T 19/00* | (2011.01) |
| *G06T 11/60* | (2006.01) |
| *G06K 9/00* | (2006.01) |
| *G06T 19/20* | (2011.01) |
| *A63F 13/58* | (2014.01) |

(52) U.S. Cl.
CPC ............ *A63F 13/215* (2014.09); *A63F 13/26* (2014.09); *A63F 13/428* (2014.09); *A63F 13/56* (2014.09); *A63F 13/87* (2014.09); *G02B 27/017* (2013.01); *G02B 27/0172* (2013.01); *G06F 3/011* (2013.01); *G06F 3/013* (2013.01); *G06F 3/017* (2013.01); *G06F 3/0304* (2013.01); *G06F 3/0346* (2013.01); *G06F 3/04815* (2013.01); *G06F 3/167* (2013.01); *G06K 9/00355* (2013.01); *G06T 11/60* (2013.01); *G06T 19/003* (2013.01); *G06T 19/006* (2013.01); *G06T 19/20* (2013.01); *H04N 7/157* (2013.01); *A63F 13/58* (2014.09); *G02B 2027/014* (2013.01); *G02B 2027/0141* (2013.01); *G02B 2027/0187* (2013.01)

(56) References Cited

U.S. PATENT DOCUMENTS

| | | | |
|---|---|---|---|
| 7,386,799 | B1 | 6/2008 | Clanton et al. |
| 2005/0261032 | A1 | 11/2005 | Seo et al. |
| 2006/0128567 | A1 | 6/2006 | Brickey et al. |
| 2008/0091692 | A1 | 4/2008 | Keith et al. |
| 2008/0215975 | A1 | 9/2008 | Harrison et al. |
| 2008/0309671 | A1 | 12/2008 | Shuster et al. |
| 2009/0177976 | A1 | 7/2009 | Bokor et al. |
| 2009/0315893 | A1 | 12/2009 | Smith et al. |
| 2011/0007142 | A1 | 1/2011 | Perez et al. |
| 2011/0216059 | A1 | 9/2011 | Espiritu et al. |
| 2011/0246908 | A1 | 10/2011 | Akram et al. |
| 2012/0127164 | A1 | 5/2012 | Rhee et al. |
| 2014/0364212 | A1 | 12/2014 | Osman et al. |
| 2015/0301592 | A1 | 10/2015 | Miller |
| 2015/0302651 | A1 | 10/2015 | Shpigelman |
| 2016/0026253 | A1 | 1/2016 | Bradski et al. |
| 2016/0033768 | A1 | 2/2016 | Pedrotti et al. |
| 2016/0086365 | A1 | 3/2016 | Petti et al. |
| 2016/0300100 | A1 | 10/2016 | Shen et al. |
| 2018/0081515 | A1 | 3/2018 | Block et al. |

FOREIGN PATENT DOCUMENTS

| | | |
|---|---|---|
| WO | 2014164901 A1 | 10/2014 |
| WO | 2015044851 A2 | 4/2015 |
| WO | 2015167909 A1 | 11/2015 |

OTHER PUBLICATIONS

Examination Report for Application No. EP 17711740.5 dated Oct. 9, 2019, pp. 1-4.
Combined British Search and Examination Report for Application No. GB1702693.1 dated Jul. 31, 2017, 9 pages.
International Search Report and Written Opinion for Application No. PCT/GB2017/050648 dated Jun. 20, 2017, 12 pages.
Basori et al., "Face-Touch: An emotional facial expression technique of avatar based on tactile vibration in virtual reality game," Virtual Reality, InTech Dec. 2010, pp. 107-126, downloaded from http://www.intechopen.com/books/virtual-reality.
Official Letter for Application No. EP17711282.8 dated Oct. 24, 2019, pp. 1-5.
Official Letter for Application No. EP 17712213.2 dated Oct. 30, 2019, pp. 1-4.
Official Letter for Application No. EP 17711741.3 dated Oct. 30, 2019, pp. 1-4.
International Search Report and Written Opinion for Application No. PCT/GB2017/050649 dated Jun. 8, 2017, 17 pages.
Combined British Search and Examination Report for Application No. GB1702700.4 dated Jul. 31, 2017, 10 pages.
Examination report for GB 1619809.5 dated Mar. 12, 2018.
Combined British Search and Examination Report for Application No. GB1619809.5 dated May 8, 2017, 8 pages.
International Search Report and Written Opinion for Application No. PCT/GB2017/050650 dated Jun. 14, 2017, 13 pages.
"Virtual Reality", Wikipedia Article, History Section, Retrieved Online https://en.wikipedia.org/wiki/Virtual_reality.
Examination Report for Application No. GB 1619809.5 dated Mar. 18, 2020, 8 pages.
Official Letter for EP17711282.8 dated Jun. 10, 2020; 5 pages.
European Communication for Application No. 17712213.2 dated Jun. 18, 2020, 5 pages.
Official Letter for Application No. EP 17711741.3 dated Jun. 9, 2020; 5 pages.

| Code | | Description |
|---|---|---|
| 1f600 | 👍 | One thumb up – happy |
| 1f606 | 👍👍 | Two thumbs up – very happy |
| 1f627 | 👎 | One thumb down – sad |
| 1f629 | 👎👎 | Two thumbs down – very sad |
| 1f62f | ☝ | One hand pointing – interested/look over there! |
| 1f62e | ☝☝ | Two hands pointing – very interested/look over there!! |
| 1f620 | ✊ | One fist – angry |
| 1f62c | ✊✊ | Two fists – very angry |
| 1f606 | 🙌 | Two palms, facing forward, either side of head, up in air – Yay! |
| 1f62e | 🤚🤚 | Two palms, facing forward, either side of face – lecturing face |
| 1f61f | 🙏 | Two palms, facing each other, in front of face (prayer position?) – imploring |
| 1f60f | 🖐🖐 | Two palms, face up, either side of head – Meh. |
| 1f60f | 🖐🖐 | Two palms, behind head – chillaxing. |
| 1f615 | ☝ | One finger pointing upwards, near mouth – Hmmm/thinking. |
| 1f616 | 🤚 | One palm, back of hand to forehead – stressed. |

VIRTUAL REALITY

CROSS REFERENCE TO RELATED APPLICATIONS

The present application is a national phase entry under 35 U.S.C. § 371 of International Application No. PCT/GB2017/050648, filed Mar. 10, 2017, published in English, which claims the benefit of and priority to GB Patent Application No. 1604203.8, filed Mar. 11, 2016, GB Patent Application No. 1619809.5, filed Nov. 23, 2016, and GB Patent Application No. 1702693.1, filed Feb. 20, 2017, the entire disclosures of which are hereby incorporated by reference herein.

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 30 is a schematic diagram of a lexicon of emojis and corresponding predetermined physical gestures.

DESCRIPTION OF THE EMBODIMENTS

Figure 1:
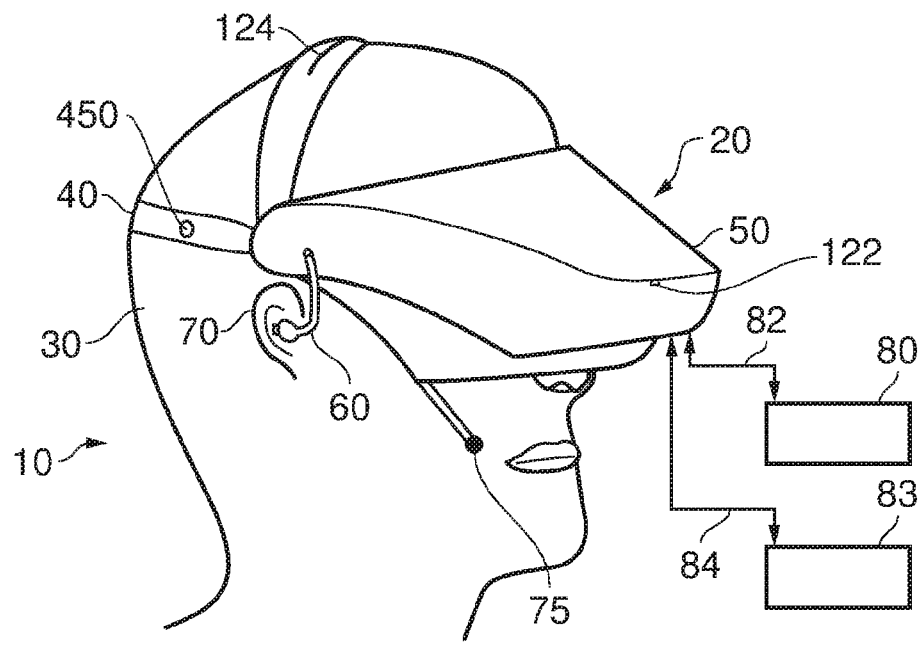
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
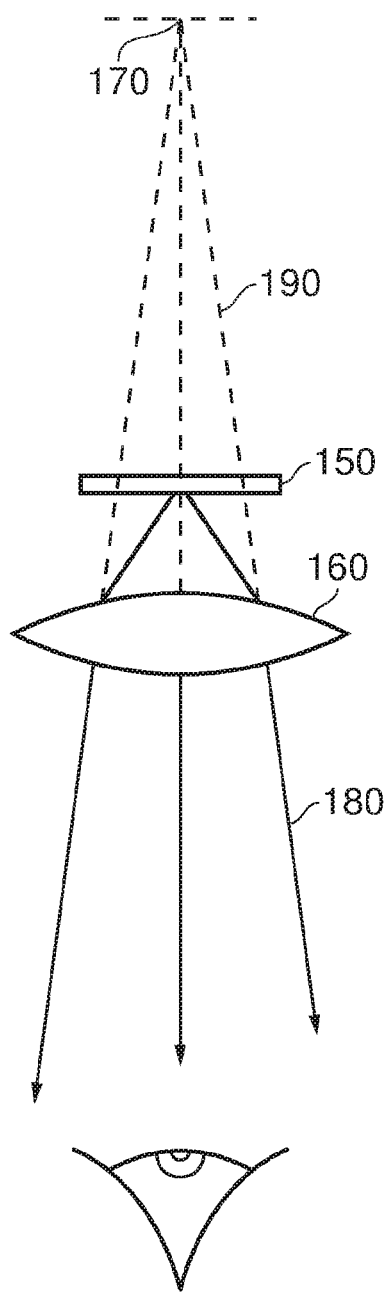
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
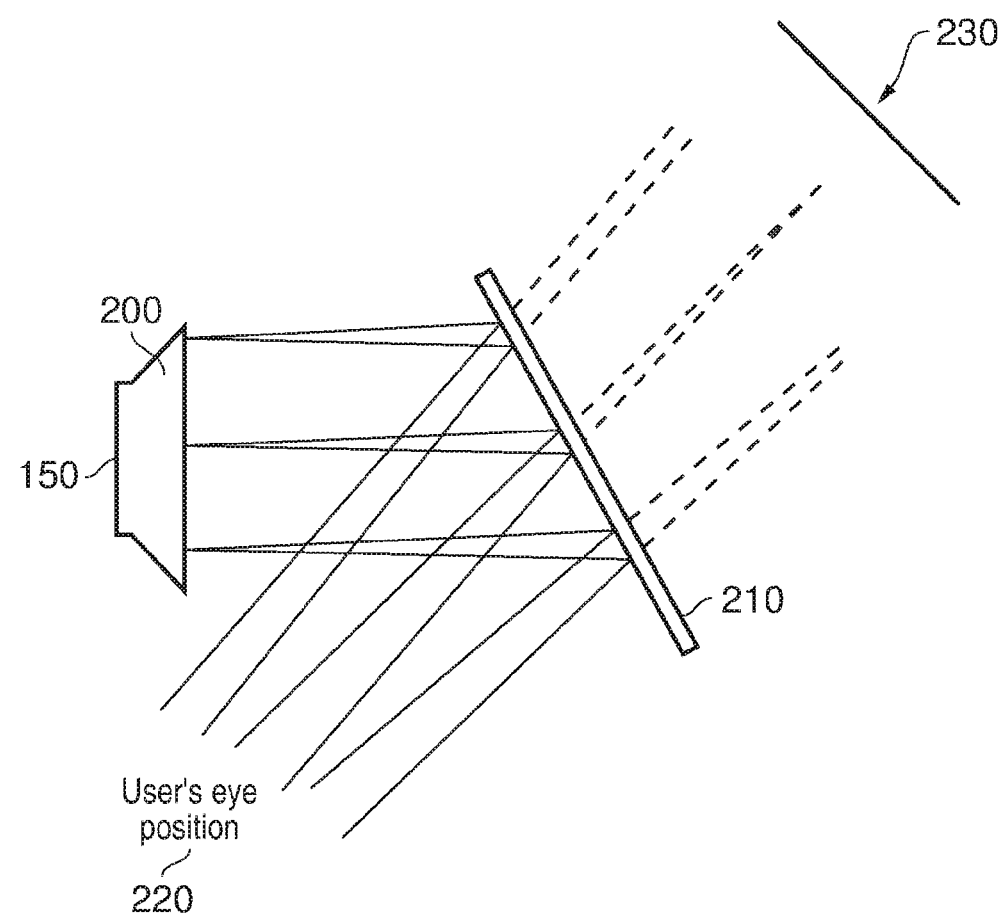
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
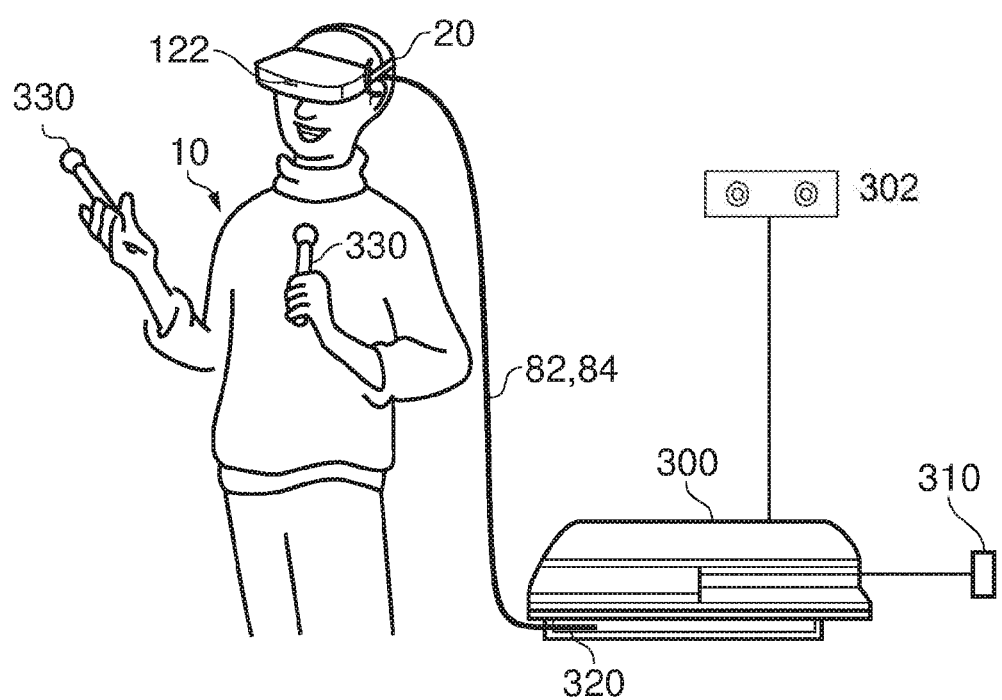
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a pair of hand-held controller 330s which may be, for example, Sony® Move® controllers which communicate wirelessly with the games console 300 to control (or to contribute to the control of) game operations relating to a currently executed game program.

Each Sony® Move® controller or a controller of a similar type suited to virtual reality experiences typically comprises one or more a mechanical or solid state sensors such as accelerometers and/or gyroscopes, enabling the controller to transmit telemetry to the games console indicative of the controller's placement in space. For example if such a controller detects acceleration, this information can be used by the controller or the games console to determine relative changes in speed and/or changes in position as well as or instead of monitoring acceleration itself. In this way, the games console can track the relative orientation, position and/or movement of the or each controller by use of the received telemetry.

Alternatively or in addition, such controllers may comprise a predetermined visible feature, such as a glowing sphere, pattern of lights, fiduciary marker, high contrast logo or the like. This feature can be detected in a video image captured by a video camera 302 operably coupled to the games console, so as to assist with tracking of a controller's position in space by use of image analysis. A single or monoscopic video camera may only be operable to track the controller's position on a 2D plane, whereas a dual or stereoscopic video camera (as shown) may be operable to track the controller's position in a 3D space.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
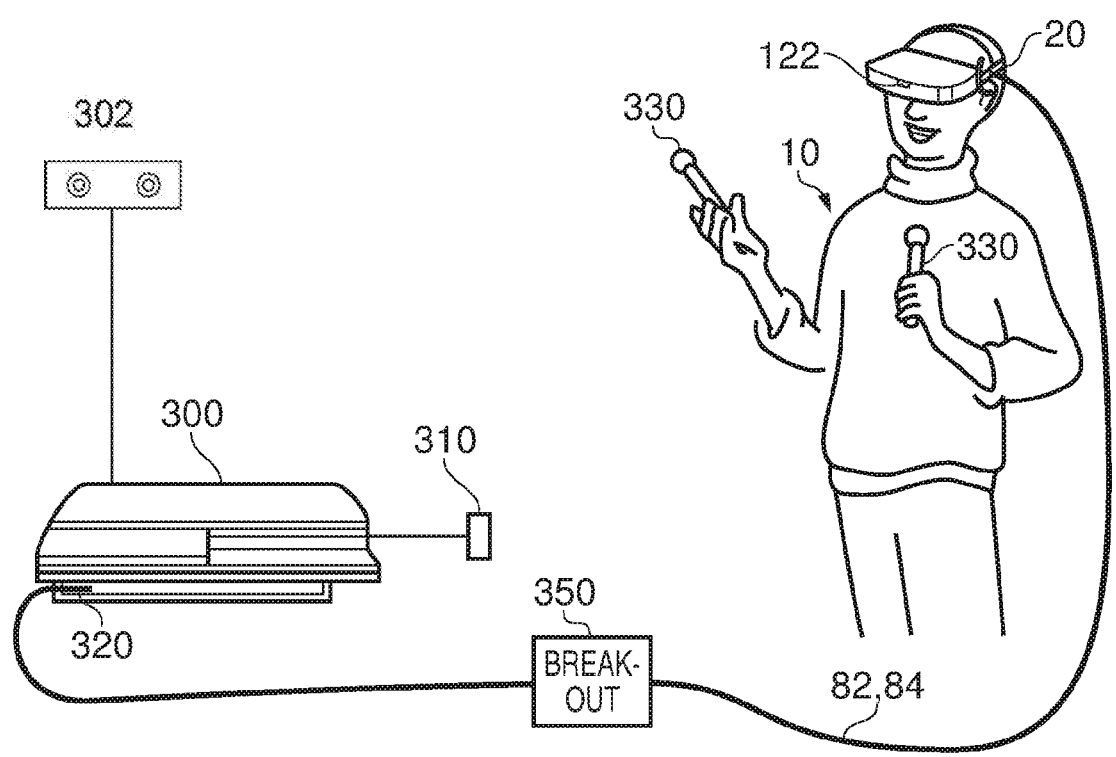

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
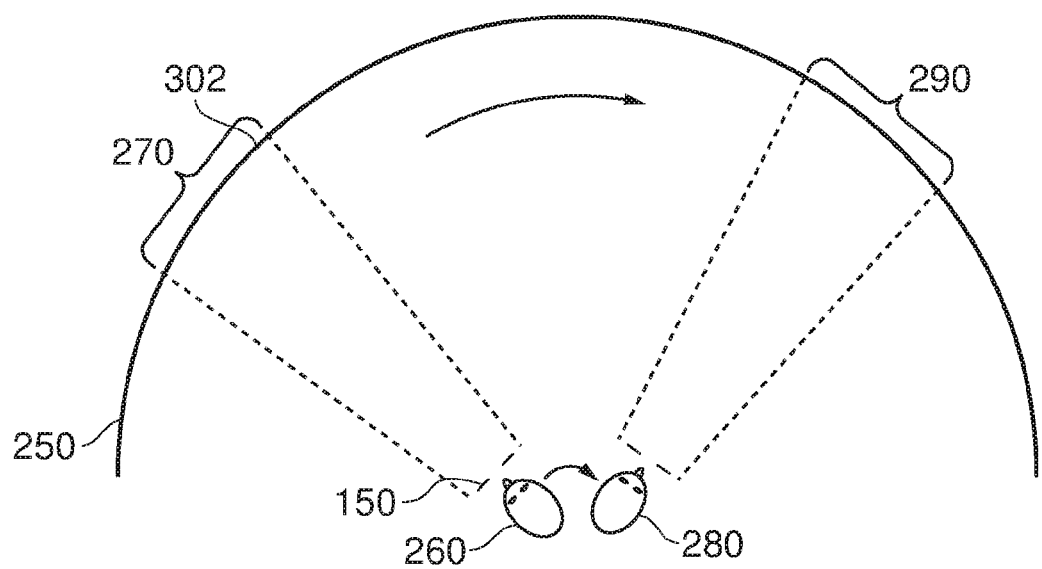
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
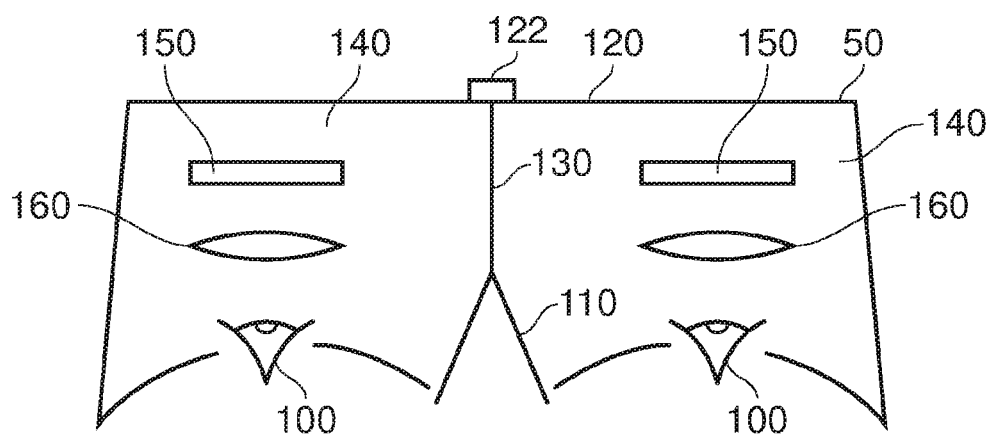
FIG. 2 is a schematic plan view of an HMD.
Figure 9A:
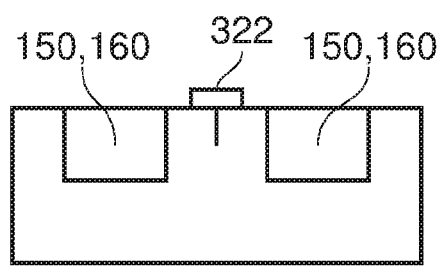
FIGS. 9*a* and 9*b* schematically illustrate HMDs with motion sensing.
Figure 9B:
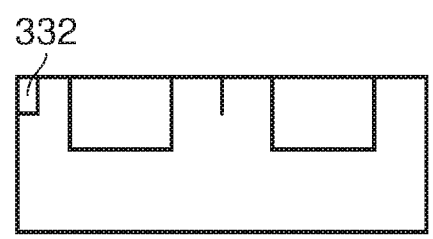

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
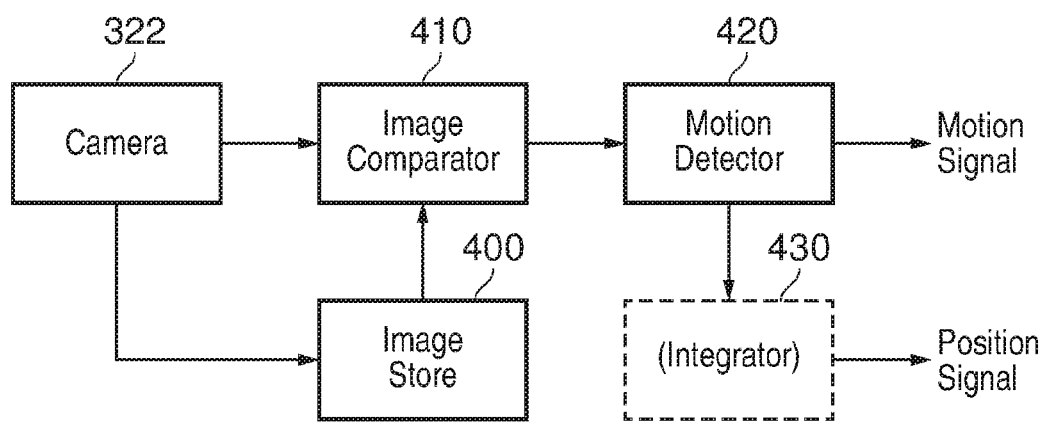
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
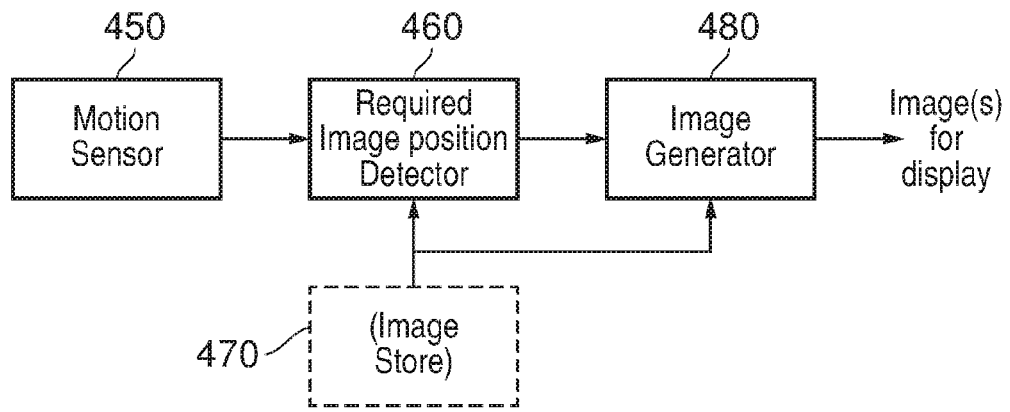
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
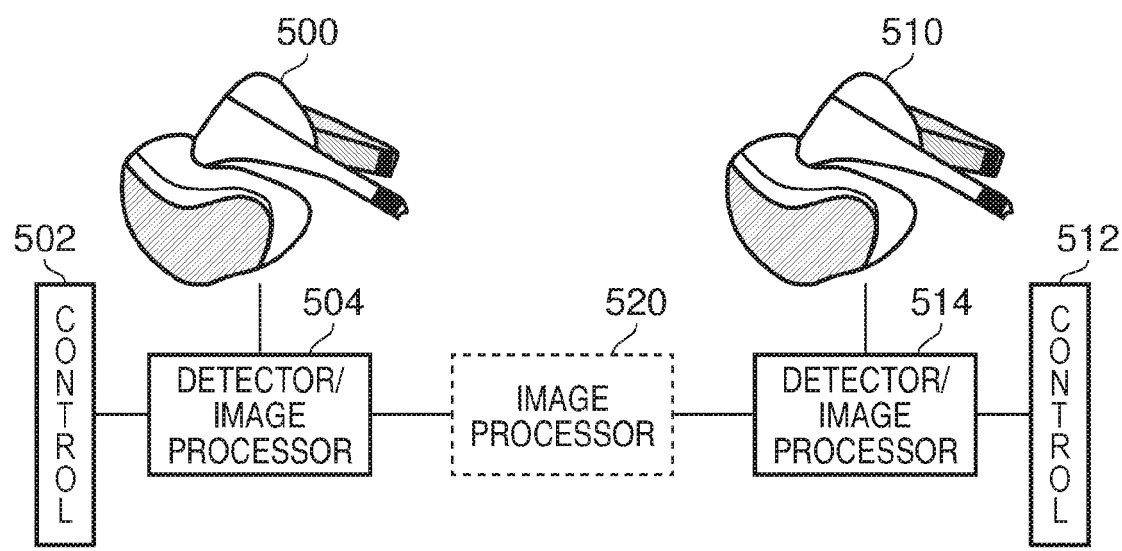
FIG. 12 schematically illustrates a virtual reality system.
Figure 13:
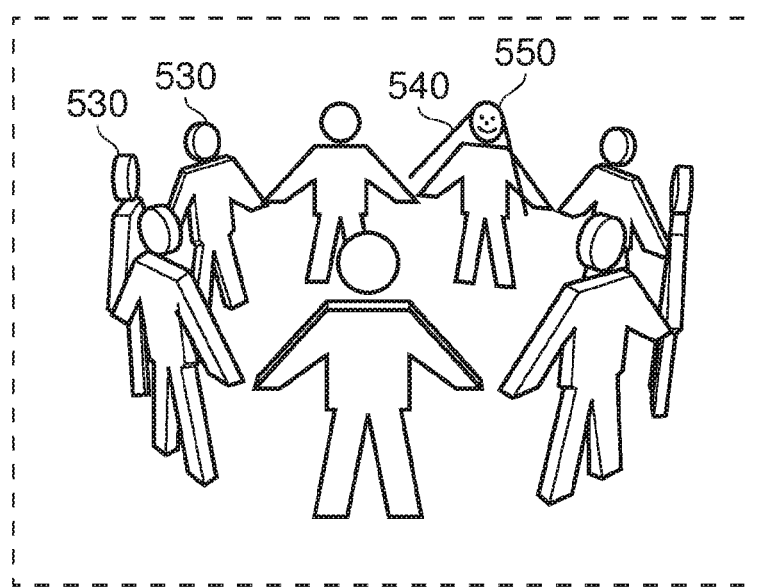
FIG. 13 schematically illustrates a virtual environment.

FIG. 12 schematically illustrates a virtual reality system involving multiple HMDs by which multiple respective users may view a shared virtual environment (FIG. 13). In FIG. 12, only two HMDs are shown for clarity of the diagram, but similar arrangements may include more than two HMDs.

In FIG. 12, an HMD 500 and an HMD 510 may be worn by respective users. The users do not need to be present in the same physical space (such as in the same room), although this is of course a possibility. In other examples, the users could be in different physical locations such as different rooms, different buildings or even different geographical locations. The users are able to share an experience of the same virtual environment by virtue of data communication between their HMDs or apparatus associated with their HMDs. In example embodiments, the communication is between PlayStation devices associated with the respective HMDs.

The HMD 500 or an associated console is optionally associated with a user control 502 for operation by the user or wearer of that HMD. Similarly, a user control 512 is optionally associated with the HMD 510 or an associated console (not shown). An example of a user control is a controller such as the controller 330 described above and/or a camera 302. In examples, the user may hold one or two such controllers 330, one in each hand, in the manner shown in FIGS. 6 and 7. Examples of how the controllers 330 and/or camera 302 can be used will be discussed below.

A detector/image processor 504 operates with respect to the HMD 500, and a detector/image processor 514 operates with respect to the HMD 510. Some image processing functions may be carried out by a shared image processing resource 520, for example a server in data communication with both users' local systems. A respective computing device (such as a games console) of each user and/or a remote server may fulfil this role.

The two (or more, as the case may be) users share a common virtual environment. The virtual environment may contain environment features with respect to a coordinate system common to all users of the virtual environment. A simple example of a virtual environment is shown schematically in FIG. 13. Here, each user is associated with a respective avatar 530, which in this example is a schematic or stylised representation of a person. Some of the avatars 530 may be machine controller non-playing characters (NPCs), while others may be associated with respective human users on a one-to-one basis. A human operator views the virtual environment via that user's HMD, with the user's current view being varied in dependence upon the orientation and/or position of the user's head, as discussed above with respect to FIGS. 8 to 11. In this way, the user can look around the virtual environment by moving the user's head. The viewpoint of the user is substantially the same as the viewpoint, in the virtual environment, of the respective avatar corresponding to that user. As the user's head and hands move around the environment, so the avatar's head and hands move around the virtual environment as well. This arrangement can provide a believable manner of interaction between users, by their respective avatars interacting as though the user was present at the viewpoint of the avatar.

Therefore, in some examples, communication is on a peer-to-peer basis between the respective PlayStation devices associated with the HMDs. In examples, each peer device (for example, an image processor (acting as an image generator) of each peer device) does the following:

(a) detects user input (for example, control buttons, or user or controller motion, position and/or orientation, microphone signal, head orientation and the like);

(b) defines one or more aspects of the user's avatar, such as hand configuration, limb configuration, facial configuration, body configuration, current location and orientation in the virtual environment and the like;

(c) distributes information to other peer(s) indicating those aspects of the user's avatar and any audio signal corresponding to a microphone input;

(d) receives information from other peer(s) indicating aspects of the corresponding other users' avatars;

(e) renders the other users' avatars (to the extent that they are within the current field of view of the current avatar) according to the received information, including in some examples generating or deriving one or more aspects locally such as eye direction, blinking and the like; and (f) renders visible aspects (such as hands, feet, torso or the like) of the current avatar along with visible features of the virtual environment.

In examples, at least some of these operations can be carried out by an image generator as part of the HMD/PlayStation device.

In other examples, a server-based network is used, such that a separate server provides coordination of the virtual environment. This could include receiving information from the HMD/PlayStation devices about operation of their respective controls and then broadcasting messages to each HMD/PlayStation device indicating facial and body configurations and other aspects. In further examples, a PlayStation device could render aspects of its own avatar and send the rendered image data to other HMD/PlayStation devices in the network. However, for economy of data traffic and potentially reduced latency, the peer-to-peer network discussed above is used in the present embodiments.

The arrangement of FIG. 12 therefore provides an example of an image generator to generate images representing a virtual environment, for display to a user by a head mountable display to be worn by that user, the virtual environment including an avatar representation of the user positioned within the virtual environment so that the user's viewpoint of the virtual environment substantially corresponds to the viewpoint of the avatar corresponding to that user.

An example 540 of an avatar's viewpoint is shown in FIG. 13 for an example avatar 550. It will be appreciated that this "first person" arrangement gives the user associated with the avatar 550 a potential view of any other avatar except the avatar 550. The user associated with the avatar 550 could move his or her head so as to view the avatar 540's feet or hands, but without making use of a virtual mirror, the user cannot see the user's own avatar 550. Therefore, although in fact, in an interaction between avatars of users in a virtual environment, facial expressions are important, a user cannot in fact see his or her own avatar's facial expression in this arrangement. It will be appreciated however that an indication of the user's avatar's current facial expression could be indicated by an icon positioned within the user's field of view, or could be temporary summoned into view by a predetermined button press on a controller or via a menu selection, if a floating icon or other persistent heads-up-display undesirable. Such temporary information could take the form of an on-screen icon, an expression status on a virtual digital assistant or watch, and/or a direct view of themselves (as represented by the avatar) in a virtual handheld mirror or the like.

Note that in other arrangements the user may choose to move the user's virtual camera to another position with respect to the user's avatar, for example giving a third person view of the user, and hence visibility of their avatar's facial expression. An example is during movement (locomotion). However, the issues discussed above can occur during at least a first person view.

The generation of images of the virtual environment is handled by the image processors 504, 514 and/or 520. Various examples will now be discussed, all of which are functionally equivalent in terms of their end result, which is the generation of appropriate images for display at the HMDs 500, 510. In each instance, the images of the virtual environment are dependent upon aspects such as: the operation of user controls by the HMD users, optionally the use of microphones associated with the HMDs and the position or orientation of the HMDs, because those aspects determine the position, configuration, motion or actions of an avatar associated with the respective HMD user.

In some examples, the image generation is carried out by the shared image processing resource 520, for example a server. In this arrangement, each detector/image processor 504, 514 detects user control operation, optionally microphone operation, and HMD orientation and/or position, and sends data indicative of these aspects to the image processor 520, which then generates images of the virtual environment for display by each HMD. Note that generally speaking, the view provided to each HMD will be different, because it depends upon the respective position and orientation of the corresponding avatar.

In other examples, each HMD is associated with a respective image processor (for example, the image processor 504 associated with the HMD 500) which generates images for display by that HMD, in dependence upon data common to each HMD defining the virtual environment, and data received from detector/image processors associated with other HMDs defining aspects such as the current position and configuration of the respective avatars.

In other examples, each HMD is associated with a respective image processor (for example, the image processor 504 associated with the HMD 500) which generates image data relating to the avatar corresponding to that HMD, for use by other image processors to render images for display by their own respective HMD.

FIG. 13 therefore provides an example of a virtual reality processing system comprising two or more apparatuses, the respective image generator of each apparatus being configured to generate images for display to the respective user of that apparatus.

Figure 14:
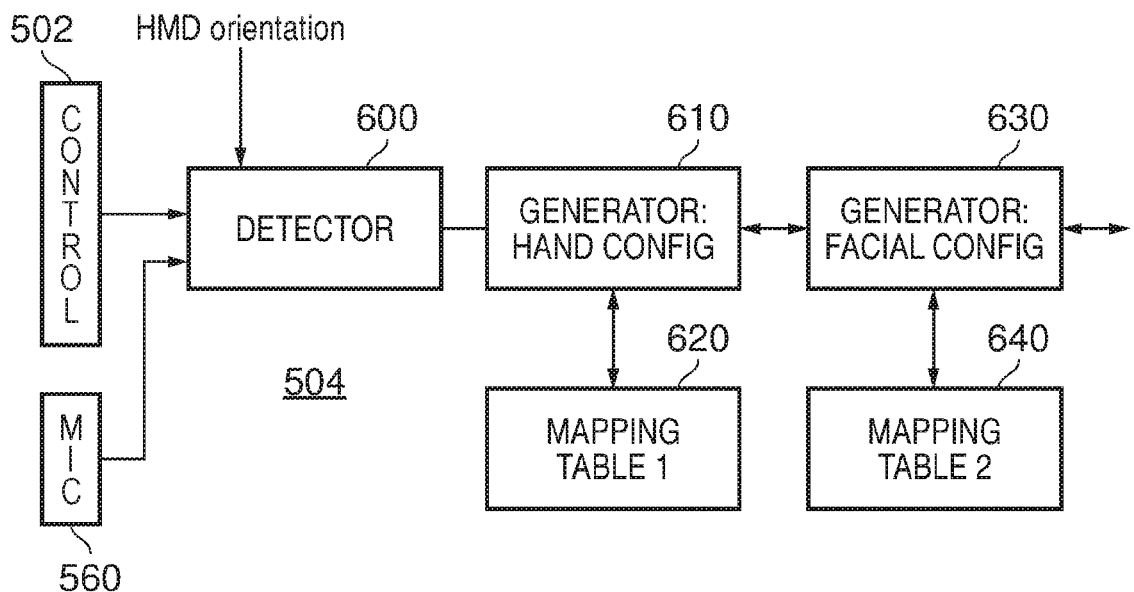
FIG. 14 schematically illustrates a detector/image processor.

FIG. 14 schematically illustrates an example of the detector/image processor associated with an HMD (such as the detector/image processor 504), in more detail.

A detector 600 receives signals from the user control 502 and optionally also from the microphone 560 associated with that HMD. This corresponds to the operation (a) discussed above.

As mentioned above, an example of the user control 502 is one or a pair of Sony® Move® controllers, each held in one hand. The or each Move controller provides a set of buttons for operation by a thumb and another finger. As noted previously herein, the or each Move controller also has one or more sensors by which the controller's position and orientation in space can be detected. Activations of the buttons, and the detected position and/or orientation of the or each controller, are examples of signals sent to the detector 600. Audio signals representing audio information captured by the microphone 560 are other examples of signals that may be sent to the detector 600. Signals from the HMD 500 indicating the current orientation of the HMD are other examples of signals that may be sent to the detector 600. The detector 600 analyses the received signals to detect a current operational mode of the user controls, the HMD and/or the microphone as appropriate.

Based on the detection by the detector 600, in one embodiment of the present invention a hand configuration generator 610 generates a hand configuration for the respective avatar, providing an example of the use of one or more user controls, the image generator being responsive to operation of the user controls by the user to configure the hands of the avatar representing that user. For example this can be carried out by reference to a mapping table 620 which maps operations of the buttons on the Move controllers to respective hand configurations. In examples, the avatar has the same number of hands (two) as the user. In this case, the Move controller held by the user's left hand controls the configuration of the avatar's left hand, and the Move controller held by the user's right hand controls the configuration of the avatar's right hand. This is an example of the user controls comprising respective controls allowing separate configuration of each of the avatar's hands. The generator 610 contributes to the operations (b), (c) and (d) discussed above.

The mapping table 620 maps button operation on a controller to a hand configuration. For example, where the operation of two buttons is detected, this gives four possibilities, shown by the following example mapping table (where Button A and Button B are identifiers simply used to distinguish the two different buttons; for example, Button A might be the thumb-operated button and Button B the other-finger-operated button):

| Button A | Button B | Hand configuration |
| --- | --- | --- |
| Not operated | Not operated | Base configuration assumed by that avatar hand in the absence of operation of the respective controls, for example a flat (open) hand, with an orientation depending on the orientation of the Move controller |
| Operated | Not operated | Protruding thumb (thumbs up or thumbs down, depending on orientation of Move controller) |
| Not operated | Operated | Pointing index finger, orientation of hand depending on orientation of Move controller |
| Operated | Operated | Fist |

The latter three hand configurations (apart from the base configuration) are examples of active configurations assumed by that avatar hand in response to operation of the respective controls.

In some examples, the buttons need not be binary "on"/"off" buttons, but can provide an output signal depending upon a degree of operation by the user, for example how far the user presses a button, and/or how hard a user is pressing a button. The corresponding hand configuration or gesture can be exaggerated or diminished by the generator 610 in dependence on the degree of activation of the respective button. For example, in the case of a pointing gesture, the pointing finger may be extended to a greater or lesser extent depending on the degree of button activation, or more or fewer fingers may be pointed in dependence on the degree of button activation by the user.

Further buttons may be provided and used. For example, in addition to the two buttons discussed above, examples of the Move controller can provide other buttons. For example, a pair of buttons disposed either side of the thumb button discussed above can be mapped to commands to rotate the respective avatar in the virtual environment, or in other words, to turn the avatar to the left (for example, by operation of a button to the left of the main thumb button) or to the right (for example, by operation of a button to the right of the main thumb button). Other examples include providing avatar locomotion (movement from one place to another in the virtual environment) using buttons other than the two main buttons. A view (in the virtual environment) of the avatar's feet can indicate the direction that the avatar is facing; this can be useful to assist the real user in aligning his or her body with that of the real avatar, in instances in which the real user has turned his or her body during gameplay.

A generator 630 generates a facial configuration. This is mapped to the hand configuration by a mapping table 640. Here, there are two hands (in the present example, though of course the arrangements would work with one hand or more than two hands) each of which may have four states (from the example of the mapping table 620 given above) which leads to 16 (4×4) facial configurations controllable in dependence upon the hand configurations. An example of the mapping table 640 contains at least the information listed below in the discussion of FIGS. 16 to 27B.

The generator 630 contributes to or provides the operations (b), (c) and (d) discussed above.

This arrangement therefore provides an example of the image generator being configured to generate respective facial configurations of the avatar for display to other users viewing the virtual environment as a mapping of the configuration of the hands of the avatar, so that the hand configuration of the avatar corresponding to a user provides an indication, to that user, of the facial configuration of the avatar corresponding to that user.

For example, the image generator is configured to generate a facial configuration in response to the current configuration of the avatar hands so that each permutation of avatar hand configurations corresponds to a respective facial configuration.

Once again, if the buttons are not binary on/off controls, the degree of operation by the user can map to variations in the degree of application of a facial configuration. For example, a set of control operations that are mapped to a "smile" can produce a mild smile in the case of a low level of activation of the respective buttons, but a broader smile in the case of a stronger level of activation of the respective buttons. Similarly, if one hand is set to a hand configuration mapped to a particular facial configuration, but the other hand is in the base configuration, the resulting facial configuration can be milder than if both hands were in the same activated hand configuration. Therefore, in examples, at least some of the facial configurations comprise at least two configuration versions; and the image generator is configured to select between versions of a facial configuration according to a degree of activation of the user controls.

In a similar manner, the microphone signal can be used to vary the degree of a facial configuration (such as mild smile—broad smile; mild frown—severe frown and the like). In the absence of an audio signal detected by the microphone, a milder facial configuration can be used. Where at least a threshold audio signal is detected, a more pronounced facial configuration can be used. In other examples, the same facial expression (such as a smile, or an open mouth or the like) can be used, but the mouth size can be varied or modulated in accordance with the microphone signal. These are therefore examples of the head mountable display comprising a microphone; at least some of the facial configurations comprising at least two configuration versions; and the image generator being configured to select between versions of a facial configuration according to audio information detected by the microphone.

Similarly, the orientation of the hands can be mapped to a facial configuration, and a transition from one orientation to another can be carried out gradually (for example, a user gradually rotating their hand to a thumbs-up position whilst holding the controller). This gradual change can be mapped to a gradual development of the corresponding facial configuration, from a mild instance of the gesture to a more pronounced instance of the configuration.

The above embodiment provides a first example of a means of mapping a user input to an avatar's facial configuration. In another embodiment of the present invention, alternatively or in addition to button presses, the position and/or orientation of the or each controller can be used to similarly signify a predetermined set of hand configurations.

In this case, a given hand configuration may be associated with a predefined but otherwise arbitrary position and/or orientation for the or each controller, in a manner analogous to how different letters of the alphabet are associated with predefined but otherwise arbitrary semaphore flag positions.

Alternatively or in addition, the position and/or orientation of the or each controller for some or all of the hand configurations may correspond to a pose that is frequently associated with a given facial configuration.

Hence holding the controllers out to each side of the body may select a hand configuration that in turn maps to a facial configuration indicating confusion. Meanwhile holding the controllers on either side of the user's head may select a hand configuration that in turn maps to a facial configuration indicating fear. Other examples will be apparent to the skilled person.

Alternatively or in addition to the position and/or orientation of the or each controller, motion such as in the form of a dynamic gesture (i.e. a detected change in position, velocity and/or acceleration) may be associated with a hand configuration. Hence for example holding two controllers with arms hanging down may (as a non-limiting example) be interpreted as a neutral or expressionless pose, but a subsequent brief lift and return of the controllers substantially in synchronisation with each other could be inferred to correspond to a shrug of the shoulders. Hence this dynamic gesture could map to a hand configuration that in turn corresponds to a facial configuration indicating indifference or acceptance. Similarly a rapid lateral movement of one controller corresponding to a punching action could map to hand configurations that in turn correspond to a facial configuration indicating anger. Other examples will be apparent to the skilled person.

In some other examples, a facial configuration can be mapped to a series of one or more hand movements. For example, a clap action repeated for a threshold number of occurrences within a particular time window (for example, three times in four seconds) could be mapped to a smile held for (say) ten seconds.

Meanwhile, phoneme based mouth animations can be used as a more advanced option than the simple mouth size variation discussed above.

In example arrangements, the orientation of each avatar hand can be controlled according to the orientation of the respective Move controller held by the user.

Optionally, the image generator is configured to generate an avatar body configuration in dependence upon that avatar's hand configuration. Again this can be by a mapping table and/or in dependence open the hand orientation. For example, both hands pointing downwards can be mapped to a stooped avatar body configuration. Both hands pointing upwards can be mapped to an avatar body configuration looking upwards. In examples, a simple body model can be used, for example a body having a pivot (within the animation) around waist level and with a fixed foot and leg position and orientation (in the absence of any locomotion or movement). The body orientation around this pivot can be controller as a mapping of hand configuration, and/or as a mapping of a detection of the (real) user's head orientation. In examples, the avatar body configuration is dependent upon the user's head (HMD) orientation. So, for example, if it is detected (by one or more orientation detectors associated with or forming part of the HMD) that the respective user has tilted his or her head forward, the avatar body pivots forward by an amount which can be dependent upon the forwards angle of the user's head. Similarly, if it is detected that the user has tilted his or her head to the right, the avatar's body can pivot about the pivot point to the right, and so on. Of course, more complex avatar joint or pivot arrangements can be used.

It will be appreciated therefore that instead of mapping button, position, orientation, and/or motion inputs to hand configuration and then associating avatar body poses with such hand configurations, these inputs may be mapped directly to physical configurations of the avatar, such as hand position, limb position, whether a limb is straight or bent, torso posture, and/or foot position in addition to or as an alternative to mapping to hand configuration.

Hence for given input configurations, the user's avatar may adopt partial or whole body poses such as a 'heroic' stance with hands on hips, an 'inspiration' or 'question' stance with one arm bent and its hand pointing up in the air, a 'facepalm' stance with the torso bent and hands placed over the face, and so on. In each case an associated facial configuration is selected as described previously herein.

Hence in such cases, the user can still infer their avatar's facial expression but from an inspection of their avatar's body pose, rather than from an inspection of hand configuration; although as noted above this may not be needed if for example an expression indicator or virtual mirror is otherwise displayed or accessible to the user.

It will further be appreciated that at least some of these whole or partial avatar configurations need not be static but could be animated, for example causing the avatar to jump up and down in an 'excitement' action, or stretch arms out wide in a 'tired' or yawning action.

Given the selected hand or whole or partial avatar body configurations and associated facial configurations, the generators 610, 630 act as an image generator to provide a rendered view of the virtual environment for local display to the user of the corresponding HMD, thereby providing the functions (e) and (f) discussed above.

Figure 15:
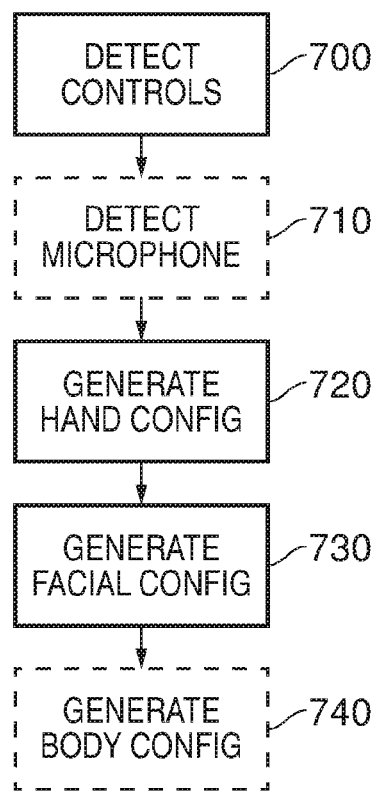
FIG. 15 is a schematic flowchart illustrating a method.

FIG. 15 is a schematic flowchart illustrating a method, such as a method of generating images representing a virtual environment, for display to a user by a head mountable display to be worn by that user. The virtual environment includes an avatar representation of the user positioned within the virtual environment so that the user's viewpoint of the virtual environment substantially corresponds to the viewpoint of the avatar corresponding to that user. The method comprises:

detecting (at a step 700) operation of one or more user controls;

optionally, at a step 710, detecting an audio signal from a microphone associated with the HMD;

generating (at a step 720) a hand configuration and/or a whole or partial avatar pose configuration in response to operation of the user controls by the user, to configure the avatar representing that user;

generating (at a step 730) a respective facial configuration of the avatar for display to other users viewing the virtual environment that corresponds to the configuration of the hands and/or whole or partial avatar pose configuration, so that the configuration of the avatar corresponding to a user provides an indication, to that user, of the facial configuration of the avatar corresponding to that user. Optionally, the facial configurations may be selected from variants of a facial configuration in dependence upon the detected microphone input or controller inputs such as degree of trigger press, or hand rotation (for example, a degree of smile may respond to trigger pressure or hand angle); and optionally, at a step 740, generating or modifying an avatar body configuration in dependence upon the user's head (HMD) orientation, for example to reflect where the user wants to direct their attention (e.g. when looking at a particular other avatar). The methods and techniques described herein recite the use of at least one controller for button input and/or orientation, position and/or movement input. As was described previously herein, the orientation, position and/or movement input can be determined from telemetry transmitted by the controller.

However as noted previously such a controller may have a visually distinctive component such as a coloured light that may be tracked visually by a camera 302. Hence alternatively or in addition to button presses and/or telemetry, a position and/or movement input of a controller may be obtained by analysis of video images from the camera 302 capturing a scene encompassing the or each controller held by the user. This analysis will typically be performed by the games console, but may optionally be performed at least in part by a processor of the breakout box or the HMD. As explained previously, depending on the capabilities of the camera (and/or available computational resources), a position and/or movement input based on the image analysis may be limited to a 2D plane or may include depth. It will be apparent that the example positions and poses described previously herein with respect to the position or movement of the controllers based on telemetry may be similarly detected by image analysis.

Such analysis may be based solely on the position of the visually distinctive component of each controller, or may be based on any number of appropriate visual cues such as the pose of the user holding the controllers and/or the position of the controllers relative to the user's body (as described previously, holding the controllers with arms outstretched away from the user's body could be indicative of confusion, whilst holding the controllers next to the user's face could be indicative of fear or surprise).

Hence optionally the positioning and/or posing of some or all of the user's body may similarly be detected. For example, a skeletal model may be generated based on detection of the user's head (for example, detection of lights on the HMD) and detection of the controllers in the user's hands.

It will be appreciated that by extension, such a skeletal model or other model of the user's body (torso and/or limbs etc) may not rely on visual recognition of the controllers in the user's hands at all, and instead directly detect the pose of the user's own body or part thereof. Consequently position, orientation and/or movement input may be provided by the user to the camera 302 without holding the or each controller, or whilst holding one controller in one hand but adopting poses made distinct by the position of the other hand and/or other body parts.

Regardless of how inputs are provided to the game console (i.e. whether via button/joystick/mouse/keyboard inputs, telemetry based inputs and/or video-based inputs), then as described previously herein, predetermined inputs correspond to predetermined configurations of the avatar's hand and/or a pose of some or all of the avatar's body (torso and/or limbs etc).

Then in turn, a facial configuration (e.g. an emotional expression) is mapped to this predetermined configuration of hand and/or body.

As noted previously, one benefit of this is to enable the user, when in a first person view, to determine what expression their avatar is showing by an intuitive visual self-inspection of their avatar's hands and/or body whilst notionally immersed in the virtual world.

However as was also noted previously, other mechanisms to confirm their facial expressions are possible, and so this correspondence is not essential.

Consequently the chain of mappings between inputs, hand or body configuration, and facial configuration may vary, for example as follows.

Firstly, where the user input is statically pose based or dynamically gesture-based, the user's avatar will typically be arranged to at least partially mimic the user's actions in real time and so will mimic the gesture as it is made. However, once a specific predefined pose or gesture has been recognised by the games console or HMD as an instruction to change a configuration, it is not necessary for the avatar to hold the pose or gesture for as long as the avatar displays the corresponding facial configuration. Hence the input pose or gesture does not need to correspond to a subsequently ongoing hand or body configuration of the avatar, although of course this is still possible as described previously herein. Instead, the pose or gesture can map directly to a corresponding facial configuration.

Hence in an embodiment of the present invention, inputs based on orientation, position and/or motion that are used to specify a facial configuration can be recognised as part of an ongoing tracking of user inputs, and result in a corresponding change in facial configuration state; but the avatar's hands and/or body may at least partially continue to mimic some or all of the users inputs rather than similarly adopt a predetermined configuration.

Clearly where the facial expression itself comprises animations or associated poses (for example smiling and nodding, or laughing and giving a fist-pump), this may temporarily override or adapt the replication of user movement by the avatar for the duration of the animation. In such a case, however, the facial expression itself may persist for longer than such an animation, which may serve merely to punctuate a change in state of facial configuration.

Similarly when user inputs are button based, then where the facility to inspect one's own facial expression is provided through other means as described previously herein, then optionally the button input sequence does not need to correspond to a hand or body configuration, and instead there can be a direct mapping between predetermined input button selection(s) and corresponding facial expressions and/or animations.

The methods and techniques described herein have discussed a one-to-one correspondence between inputs and hand/body configurations and/or facial configurations. However it will be appreciated that a many-to-one mapping between inputs and facial configurations is possible. Hence for example several different physical gestures may map to an associated single facial expression. For example clapping, jumping up and down, and doing a twirl may all cause the avatar expression to be happy, whilst a thumbs down action, or putting one or more hands near the face may cause the expression of a user's avatar to be sad.

Conversely, it will be appreciated that a one-to-many mapping between inputs and facial configurations is possible. As was described previously herein, this may be due to certain inputs having a variable component such as trigger button pressure or hand orientation changing the extent of a smile. However, for a given button input selection or position, orientation and/or motion input, optionally one of several expressions may be selected in response to other factors.

For example, certain expressions may be age restricted and hence not available to some users. Similarly, some expressions may be gender specific, or the same expression may be triggered by different input poses or gestures depending on the gender of the user.

Meanwhile, the same input may result in the selection of a different facial configuration depending on the context of the virtual environment; for example if the avatar is holding a bottle of wine, then putting a hand forward is likely to be a friendly gesture to be accompanied by a smile, whereas if the avatar is holding an axe then putting a hand forward is likely to be an unfriendly gesture and could be accompanied by a frown. Consequently virtual objects and/or environments may comprise emotion preference metadata indicating what inputs should correspond to what facial configurations, so that the same input may result in a different facial expression depending on the overall environment and/or individual interactions with particular avatars or objects. Similarly, the time at which an input is provided may result in the selection of a different expression; for example holding one's arms out from one's side may result in a quizzical expression when performed during the day, but may result in a yawn or tiredness expression when performed after a threshold time in the evening.

Furthermore, it may be possible to change the avatar's facial configuration without any specific configuration input from the avatar's user. In particular, a time-out function may be provided that resets and avatar's face to a neutral expression after a predetermined period of time and/or after a predetermined event other than the inputs described previously herein. For example, an expression selected whilst another user is talking may be reset when or soon after that other user stops talking. Similarly, a facial expression selected by a user when with a particular other user or group may be reset when the user moves away from that other user or group by a threshold distance, or when a new person joins a group. The particular rules for these transitions may be chosen by a designer of a virtual environment, or via user settings.

Similarly, some environmental events may automatically trigger an associated facial expression in nearby avatars; for example a firework going off may trigger an expression of surprise or delight on the face of any avatar within a predetermined distance and/or on the face of any avatar looking approximately in the direction of the firework. Similarly if another user holds up a virtual camera, avatars within that camera's virtual field of view may all smile, or adopt an expression pre-selected by their respective users for such an occasion. Hence again such environmental events or objects may comprise emotion preference metadata indicating what facial expressions should be selected in response to interaction with the object, whether direct (interaction by the user) or indirect (e.g. in proximity to interaction by another user).

The methods and techniques discussed herein may be performed by programmable hardware executing computer software which, when executed by such a computer, causes the computer to execute the method defined above. The software may be provided by a non-transitory, machine-readable storage medium which stores the computer software.

In some examples, as discussed previously, the "local" image generator at or associated with an HMD is configured to generate images representing other avatars corresponding to other users interacting with the virtual environment. These avatars can be based upon information sent from the other users' apparatus indicating at least facial configurations. In this way the local image generator is configured to generate an image representing another avatar having a facial configuration dependent upon user control operations by the corresponding user.

When it comes to the eye direction of such a locally generated avatar, in some examples, an eye direction (gaze) detector at the other HMD can detect the direction and/or blinking of the (real) eyes of the HMD wearer (or the avatar's eyes) and send information indicating this direction to allow a corresponding direction and/or blink to be rendered for the avatar of that user. In other examples, such as examples using HMDs not having a gaze detection facility, the eye direction can be selected at the local apparatus rendering an image for display at a local HMD. In an example, the image generator is configured to generate an image representing another avatar having an eye direction dependent upon a position, relative to that avatar, of another avatar in the virtual environment engaging in an activity. Examples of such an activity can include one or more of: moving, talking, interacting with an NPC, fighting and so on. Note however that eye direction could be affected by other factors—for example, an avatar could simulate looking at a dramatic event happening nearby, such as a rock crashing down. So more generally, the avatar's eyes can be responsive to such general eye-look trigger items. Again as noted above, such objects (including other avatars) may comprise emotion preference metadata indicating which of the available facial configurations or actions of the avatar to use in response to the action of the object.

Illustrative examples of facial expressions triggered by hand configurations will now be discussed with reference to FIGS. 16 to 27B.

Figure 16:
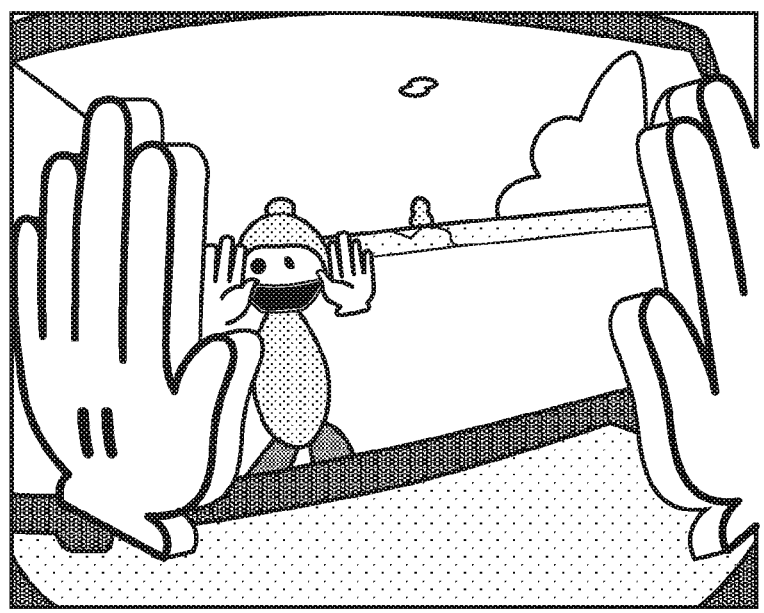
FIGS. 16 to 27B are schematic examples of mappings between facial configurations and hand configurations.
Figure 17:
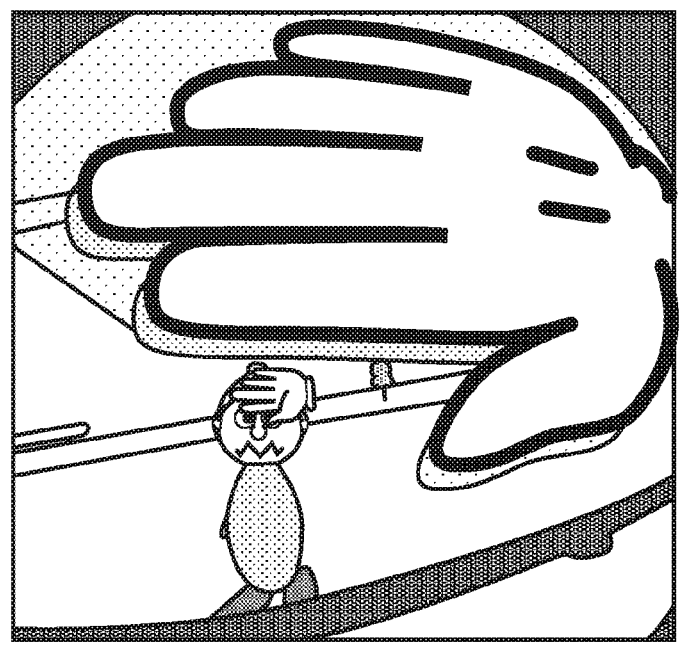

FIGS. 16 and 17 each represent an avatar viewing itself in a virtual mirror, so illustrating the way in which the avatar's hand configuration and facial configuration map together so that by viewing its own hands (in the absence of such a virtual mirror) the avatar indicates to its user the current facial configuration even though the avatar cannot actually see its own face. It will be appreciated that similarly whole or partial body (limb and/or torso) configurations could also be considered but are not shown here for simplicity. It will also be appreciated that triggering facial expressions in response to hand and/or body configurations is optional, as described previously herein.

FIGS. 18A to 27B are arranged slightly differently. The first drawing (the "A" figure) of each A-B pair is a view of the avatar as seen by other avatars in the virtual environment. The second ("B") drawing of each pair is the avatar's own view of its own hands.

Figure 18A:
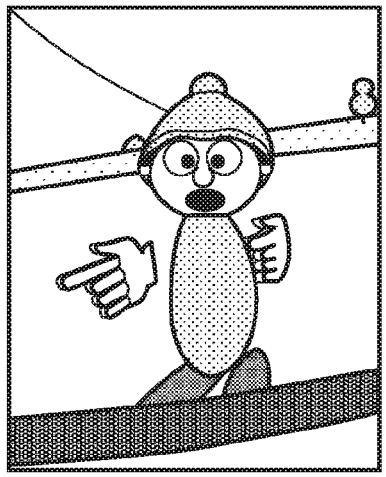
Figure 18B:
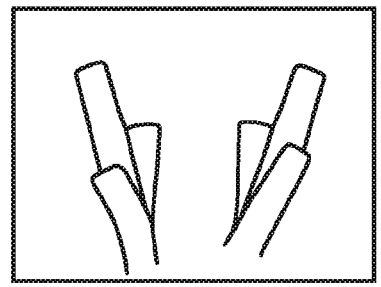
Figure 19A:
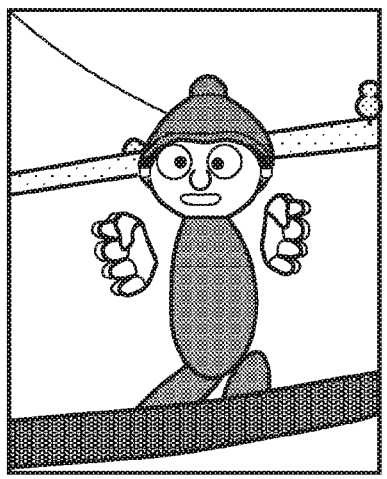
Figure 19B:
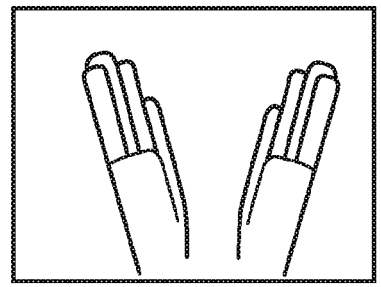
Figure 20A:
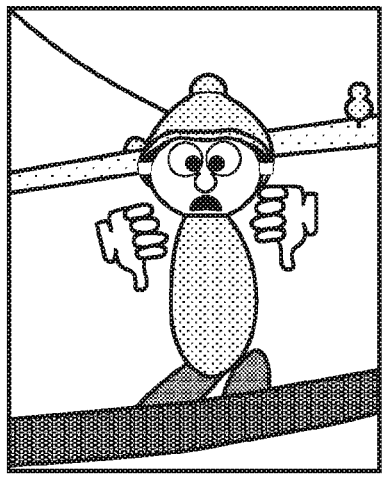
Figure 20B:
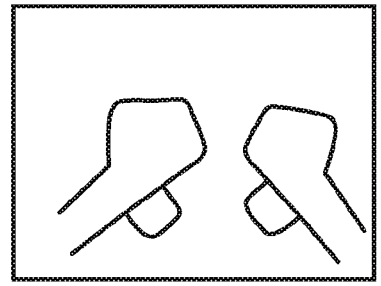
Figure 21A:
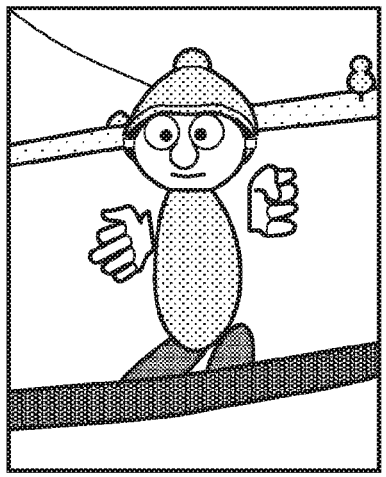
Figure 21B:
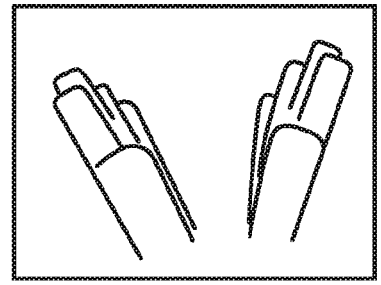
Figure 22A:
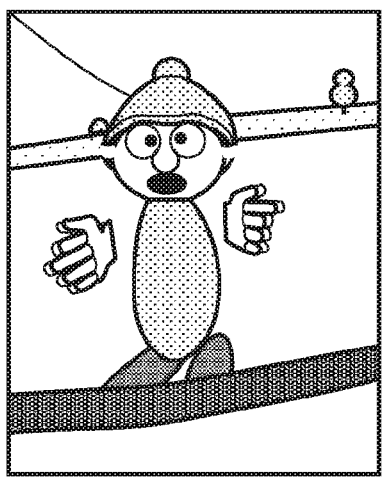
Figure 22B:
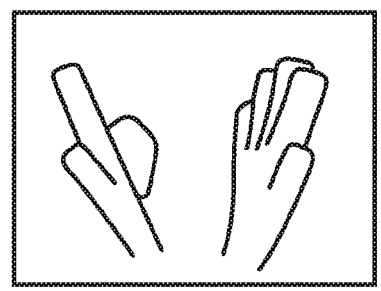
Figure 23A:
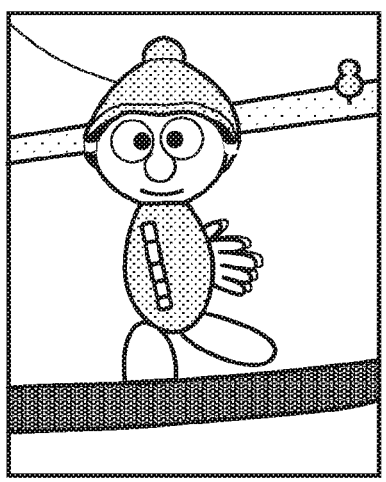
Figure 23B:
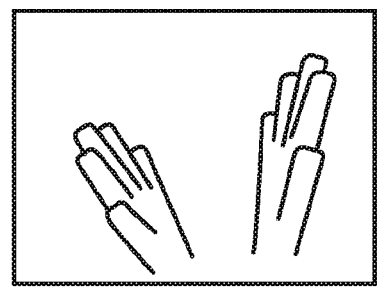
Figure 24A:
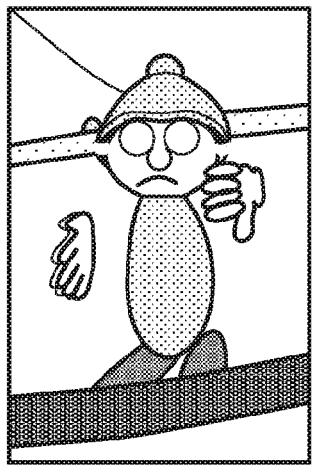
Figure 24B:
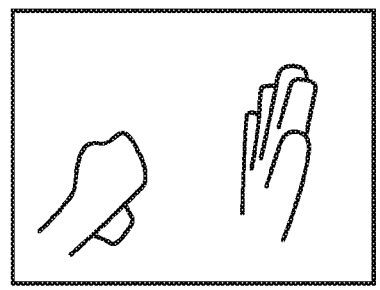
Figure 25A:
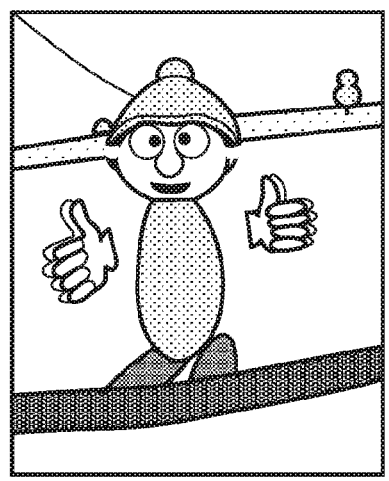
Figure 25B:
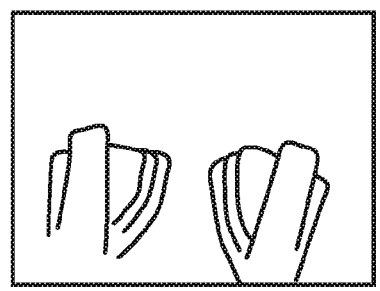
Figure 26A:
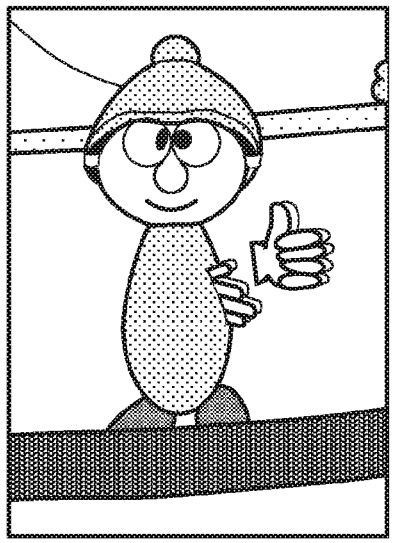
Figure 26B:
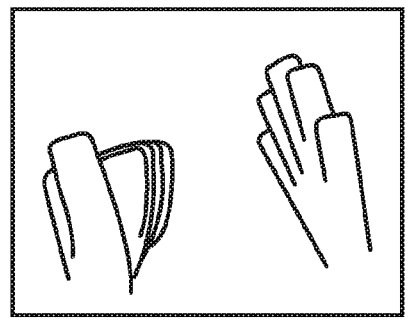
Figure 27A:
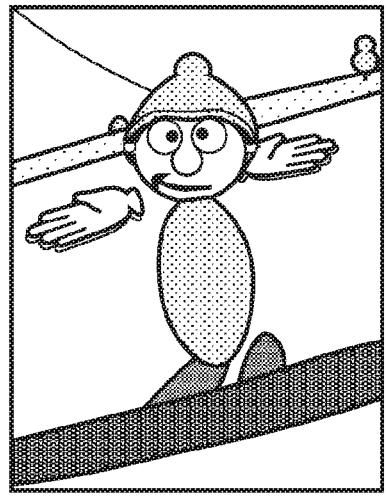
Figure 27B:
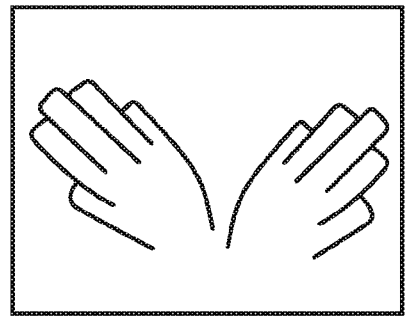

| FIG. number | Gesture | Facial expression triggered |
|---|---|---|
| FIG. 16 | Both hands open and forward | Enthusiastic face |
| FIG. 17 | One open hand against forehead | Stressed face |
| FIGS. 18A & B | Both hands pointing | Super concentrating face |
| FIGS. 19A & B | Two fists | Super angry |
| FIGS. 20A & B | Two thumbs down | Super sad |
| FIGS. 21A & B | One hand pointing | Slightly concentrating face |
| FIGS. 22A & B | Two open hands | Neutral |
| FIGS. 23A & B | One fist | Slightly angry |
| FIGS. 24A & B | One thumb down | Slightly sad |
| FIGS. 25A & B | Two thumbs up | Super happy |
| FIGS. 26A & B | One thumb up | Slightly happy |
| FIGS. 27A & B | Two open hands palm-up | Expression of distaste |

Accordingly, in examples, the hand configuration of the avatar corresponding to a user provides an indication, to that user, of the facial configuration of the avatar corresponding to that user.

In some examples, the selected facial configuration can be overridden, or in other examples only the "neutral" facial configuration is overridden, by a facial configuration automatically derived from aspects of the settings or operational characteristics of the corresponding user's HMD. For example, if the user's microphone is muted (by operation of a user control) the neutral facial configuration can employ a schematic "X" shape instead of a neutral mouth. In another example, if the user has removed his or her HMD from the head (a feature which can be detected by current HMDs at the priority date) the avatar can be placed into a "sleeping" body and facial configuration.

It will be appreciated that in cases where the input comprises button selections, the user operating the controls can make abrupt changes from one button configuration to another. In some examples these can be represented by similarly abrupt transitions from one facial configuration to another, so that (subject to any minor processing delay) the facial configuration follows the prevailing button configuration. In other examples, an animated transition from one facial configuration can be used so as to provide a more gradual transition. This can be performed by animation techniques. In a simple example, a look-up table of transitional facial configurations can be provided so as to give a set of intermediate facial configurations, for example between each facial configuration in the table above and a neutral facial configuration. For example, if the buttons corresponding to "super happy" are pressed, the facial configuration can follow a sequence of little smile➔ slightly happy (from the table above)➔ larger smile➔ super happy (from the table above), for example over the course of 0.8 seconds in total. If the button configuration is then changed by the user to "super angry", the facial configuration could return through that same sequence over (say) 0.8 seconds to neutral, and then progress through a similar sequence of "growing anger" to "super angry" over another 0.8 seconds. Clearly, the rate of change is a simple design feature and other rates of change could be used. It will be appreciated that such techniques may also be used to transition from any facial expression to any other facial expression, for example when changing expression state after detection of a particular physical pose or gesture.

The above examples and techniques have been illustrated with reference to a user's avatar, which is typically an object rendered within a virtual environment shared by a plurality of users. As such, applying these examples and techniques only to such avatars may potentially limit their use to such shared virtual environments. However, it is desirable for a user to share their experiences and emotions with a wider audience than those in the immediate vicinity of that user within a virtual space at a particular time.

For example, it would be preferable for a user to be able to express their emotions to a wider audience of friends on social media, or to record their emotions for posterity in a video capture of a game experience. Furthermore, when a user wishes to record or share their own view of the virtual environment, often their own avatar is not visible in the recorded view because the viewpoint is from a first-person perspective, or from a virtual camera over their shoulder. Similarly even within a shared virtual environment, a user's avatar is not always facing towards another user, making it difficult for that other user to gauge an emotion expressed by the avatar's face, or the avatar is not sufficiently expressive to allow the clear conveyance of emotion; for example if the avatar is a monster, or robot. Hence again for these reasons it is desirable to be able to alternatively or in addition convey the user's emotions using the techniques described herein without direct reliance on being able to see the user's avatar's face.

Accordingly, in an embodiment of the present invention, the user can select one of a plurality of so-called emoji's (illustrated abstractions of emotions) for circulation within the shared virtual environment and/or outside it. The selection of an emoji can occur in parallel with the selection of an avatar's facial expression as described previously, so that for example an emoji may optionally be displayed above the avatar's head to clearly indicate the emotion also shown by the avatar itself, thus providing clear visibility of user emotions regardless of the relative positioning of two users in the environment. Similarly if an emoji is summoned by the user (for example as part of a typed message or during selection of one or a plurality of stock messages), by default it may correspond to their avatar's current expression, or a menu of emojis may initially pre-select tat corresponding emoji. Alternatively or in addition, an emoji can be selected separately to a user's avatar's current expression (for example during the composition of a message, or setting a separate status notice), thus potentially allowing a user to be 'two faced', expressing different emotions to different audiences.

Figure 28:
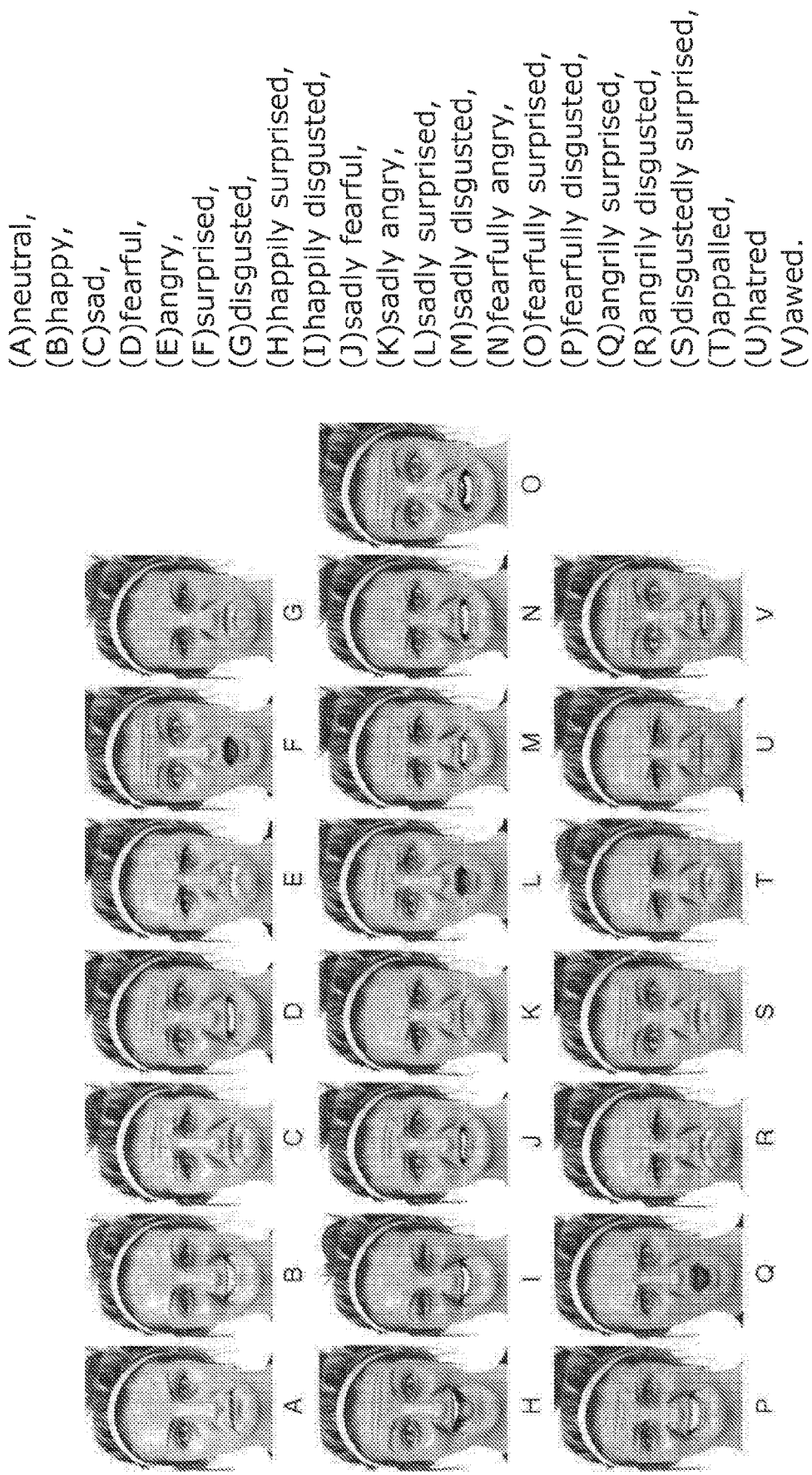
FIG. 28 is a schematic example of facial expressions that a user may wish to express.

Referring now to FIG. 28, this illustrates a set of facial expressions corresponding to human emotions that a user may wish to convey; it will be appreciated that this is not necessarily a complete set, and the labels used to identify the expressions may vary depending on the individual perceiving the emotion, and/or cultural cues (This particular set is found in Shichuan Du, Yong Tao, and Aleix M. Martinez, "Compound facial expressions of emotion", PNAS v111 No. 15, April 2014).

Figure 29:
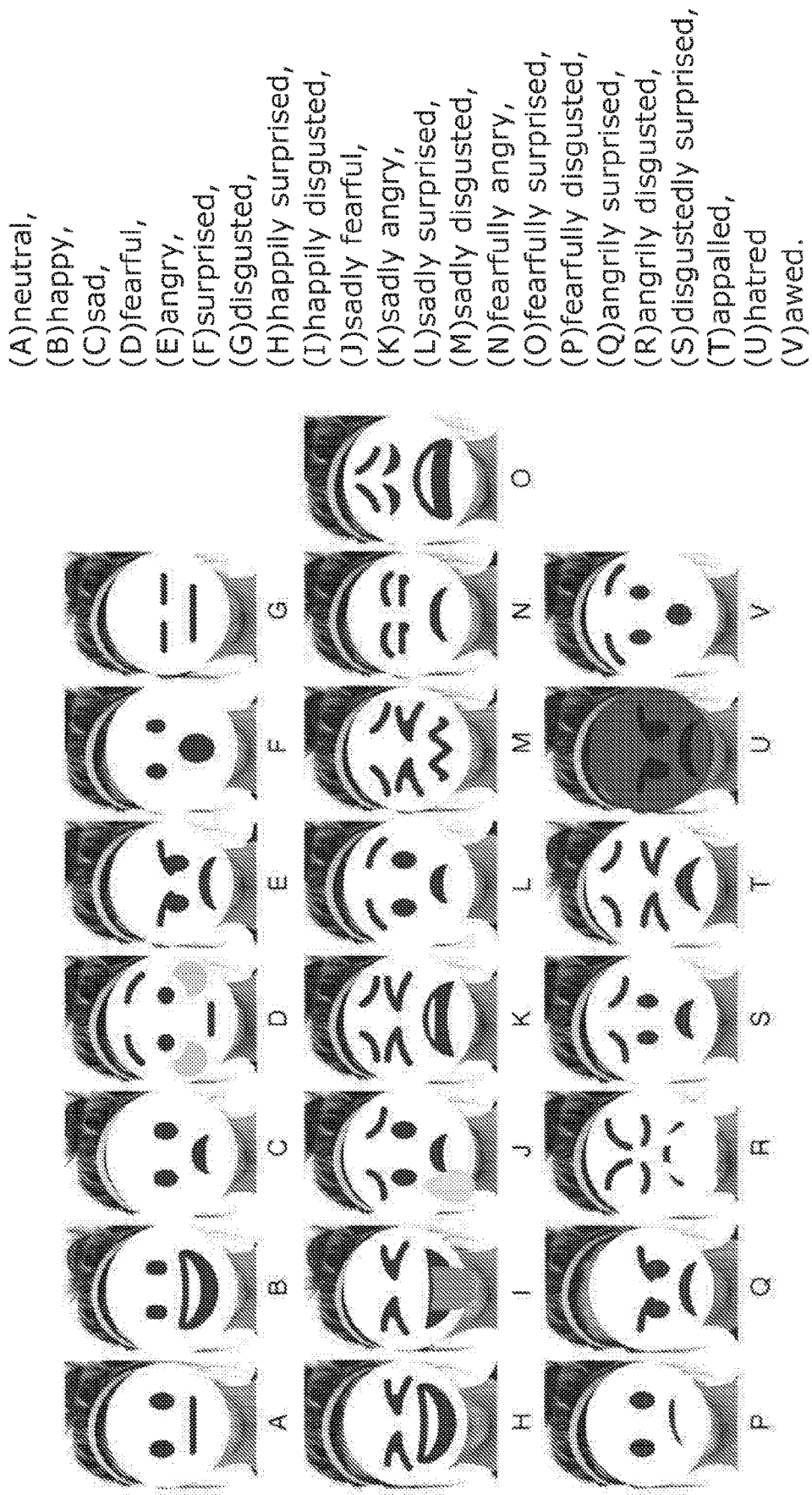
FIG. 29 is a schematic example of emoji graphics that correspond to the facial expressions shown in FIG. 28.

FIG. 29 shows a corresponding set of emojis, which as noted above provide abstracted or symbolic illustrations of these facial expressions.

In accordance with an embodiment of the present invention, a lexicon of emojis may be provided and selected between using the techniques described herein, for example by using hand configurations (e.g. selective finger/thumb extension, hand orientation and the like) and optionally hand positioning (e.g. near the user's face, or parts thereof) to select individual emojis in a manner similar to selecting avatar facial expressions as described previously herein.

FIG. 30 shows such a lexicon. It will be noted that this represents a subset of the emojis/emotions shown in FIG. 29, and also that similar emojis may be attributed to different meanings/emotions (often dependent upon context)—hence the emoji for 'surprised' can also be a 'lecturing face' in the examples of FIGS. 29 and 30. Similarly the same emotion can be conveyed by different emojis—hence 'angry' uses different emojis in FIGS. 29 and 30, but the overall meaning of either emoji is clear.

A selected emoji may be used in one of several ways. For example, it may be superposed above a user's avatar within the virtual environment, so that the conveyed emotion is clear irrespective of whether the avatars face itself is viewable or readable, in the sense of being able to reliably convey the intended emotion. It may also form or be incorporated into a message or status update, to be sent either to other users within the virtual environment, or to friends of a user as listed within a network hosted by the manufacturer of the apparatus and/or developer/publisher of the game (such as the Sony PlayStation Network®), and/or to friends on a third party social network, such as Facebook® or Twitter®.

In a summary embodiment of the present invention, a virtual reality apparatus comprises an image generator 300 (such as a PlayStation® games console) to generate images representing user of a virtual environment, for example for display to a user 10 by a head mountable display 20 to be worn by that user, or other users in a shared virtual environment, or another audience such as one connected via a mobile app, or viewing a stream on a service such as Twitch® or a video on YouTube®, or tracking a user's status on social media; the image generator being responsive to selection of a predetermined input by the user; a video camera (such as video camera 302) for use in image-based tracking of a user by the image generator; in which the predetermined input selected by the user is the performing of a predetermined physical gesture in view of the video camera (as noted above, typically a configuration of the hand or hands, optionally in conjunction with positioning of the hand or hands, for example relative to a part of the user's body such as the head or some/all of their face) and the image generator being arranged to select a respective emoji responsive to the predetermined physical gesture of the user for display to other users, such as one or more of those user groups mentioned above.

In an instance of the summary embodiment, the virtual environment includes an avatar representation of the user positioned within the virtual environment so that the user's viewpoint of the virtual environment substantially corresponds to the viewpoint of the avatar corresponding to that user; and the image generator is arranged to generate respective facial configurations of the avatar responsive to the predetermined physical gesture of the user for display to other users viewing the virtual environment. In this case, typically the entertainment device of the respective user transmits data indicating the generated facial configurations (e.g. face pose data, or data indicating one of a plurality of predetermined expressions) to other entertainment devices of other users, for example either directly or via a server administrating the virtual environment.

In an instance of the summary embodiment, then as noted above a video camera 302 is used in image-based tracking of a user (and optionally a control device) by the image generator 300, as described previously herein.

It will be appreciated that any suitable combination of predetermined physical gestures and user controls may be considered; as noted previously, a user may hold one PlayStation Move® controller that provides telemetry back to the console, whilst both the Move controller and the user are tracked by video camera 302, with the combined data of the telemetry and image analysis determining a pose and hence a corresponding emoji and optionally facial configuration.

In an instance of the summary embodiment, consequently the predetermined inputs may also comprise one or more selected from the list consisting of pressing one or more predetermined buttons; adopting a predetermined pose while holding a control device 330; adopting a predetermined pose in view of a video camera 302 used in image based tracking by the image generator 300; and performing a predetermined physical gesture while holding a control device 330, as described previously herein. Again it will be appreciated that any suitable combination of such inputs may be considered.

In an instance of the summary embodiment, the predetermined input selected by the user corresponds to a configuration of the avatar's hands, and the image generator is arranged to generate respective hand configurations of the avatar for display to other users viewing the virtual environment, and optionally also the user, where they have an avatar whose hands can be positioned within their field of view. In this case therefore, both the hands and optionally the face of the avatar are adapted in response to the input together with the selection of the emoji. This helps the user to confirm that their hands are being recognised as being in the desired configuration.

In an instance of the summary embodiment, the predetermined input selected by the user corresponds to a configuration of some or all of the avatar's body (i.e. torso and/or limbs), and the image generator is arranged to generate respective body configurations of the avatar for display to other users viewing the virtual environment. In this case therefore, both the body and optionally the face of the avatar are adapted in response to the input, together with the selection of the emoji.

In the above cases of configuring the avatar's hands or body, each permutation of avatar hand configuration or body configuration corresponds to a single respective emoji and optionally facial configuration. Alternatively or in addition, plural permutations of avatar hand configurations or body configurations may correspond to a single respective emoji and optionally facial configuration, as described previously herein.

In an instance of the summary embodiment, a single predetermined input is associated with the configuration of two or more emojis and optional facial configurations, from which the selection of one emoji and optionally one facial configuration is in dependence upon one or more selected from the list consisting of metadata associated with the virtual environment; metadata associated with a virtual object in the virtual environment with which the user's avatar is interacting; metadata associated with another avatar with which the user's avatar is interacting; and the time of day, as described previously herein.

In an instance of the summary embodiment, the image generator is arranged revert the emoji and optionally the facial configuration of the avatar representing that user to a default emoji (for example a neutral emoji shown in FIG. 29) and optionally facial configuration in response to one or more selected from the list consisting of the elapse of a predetermined period of time; and the occurrence of a predetermined event other than a user selection of a facial expression, as described previously herein.

In an instance of the summary embodiment, an object in the virtual environment is associated with emotion preference metadata indicative of an emoji and optionally a facial configuration, and the image generator is responsive to interaction by the user with the object to select an emoji and optionally configure the face of the avatar representing that user in accordance with the emotion preference metadata, as described previously herein.

In an instance of the summary embodiment, the image generator is configured to generate emojis representing other avatars corresponding to other users within the virtual environment. As was noted previously, a user's device may transmit the locally selected emoji for that user to other apparatuses, either directly or via a server. Hence conversely a user's apparatus may receive such data and display emojis accordingly. Optionally, the image generator is configured to generate an image representing another avatar having a facial configuration dependent upon user control operations by the corresponding user. In this optional case, the image generator may be configured to generate an image representing another avatar having an eye direction dependent upon a position, relative to that avatar, of an eye-look trigger item.

In an instance of the summary embodiment, the apparatus comprises a memory (such as a RAM or HDD of the Sony Playstation 4®) adapted to hold a look-up table associating a lexicon of predetermined physical gestures with a corresponding lexicon of emojis. An example of such a lexicon is illustrated in FIG. 30, as described previously.

In an instance of the summary embodiment, the apparatus comprises a head mountable display 20.

Meanwhile in another summary embodiment of the present invention, a method of generating images representing a user of a virtual environment, comprises the steps of using a video camera (such as video camera 302) for image-based tracking of a user; detecting (for example using a processor of Sony PlayStation 4® 300 operating under suitable software instruction) a predetermined physical gesture performed by the user in view of the video camera (such as configuring a hand or hands, and optionally orienting a hand or hands, and optionally posing a hand or hand, for example relative to a part of their body, as described previously herein); and selecting a respective emoji responsive to the predetermined physical gesture performed by the user, for display to other users (such as for example those viewing the virtual environment, and/or potentially others, as described previously herein).

Instances of this summary embodiment corresponding to the operation of the apparatus in the preceding summary embodiment are also clearly understood to be within the scope of the appended claims.

As noted previously herein, such methods and techniques may be implemented by conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will be apparent that numerous modifications and variations of the present disclosure are possible in light of the above teachings. It is therefore to be understood that within the scope of the appended claims, the disclosure may be practised otherwise than as specifically described herein.

The invention claimed is:

1. A virtual reality apparatus comprising:
an image generator configured to generate images representing a user of a virtual environment, the image generator being responsive to selection of a predetermined input by the user; and
a video camera configured for use in image-based tracking of a user by the image generator;
in which the predetermined input selected by the user is the performing of a predetermined physical gesture in view of the video camera, and
the image generator is configured to select a respective emoji responsive to the predetermined physical gesture of the user for display to other users,
in which:
the image generator is configured to revert the emoji representing the user to a default configuration in response to one or more selected from the list consisting of:
i. elapse of a predetermined period of time; and
ii. occurrence of a predetermined event other than a user selection of a facial expression.

2. Apparatus according to claim 1, in which:
the virtual environment includes an avatar representation of the user positioned within the virtual environment so that the user's viewpoint of the virtual environment substantially corresponds to the viewpoint of an avatar corresponding to that user; and
the image generator is configured to generate respective facial configurations of the avatar responsive to the predetermined physical gesture of the user for display to other users viewing the virtual environment.

3. Apparatus according to claim 1, in which the predetermined input further comprises adopting a predetermined pose in view of the video camera.

4. Apparatus according to claim 1, in which the predetermined input selected by the user corresponds to a configuration of hands of the avatar, and the image generator is configured to generate respective hand configurations of the avatar for display to other users viewing the virtual environment.

5. Apparatus according to claim 1, in which the predetermined input selected by the user corresponds to a configuration of some or all of a body of the avatar, and the image generator is configured to generate respective body configurations of the avatar for display to other users viewing the virtual environment.

6. Apparatus according to claim 4, in which:
each of the hand configurations corresponds to a single respective emoji.

7. Apparatus according to claim 4, in which:
plural hand configurations correspond to a single respective emoji.

8. Apparatus according to claim 1, in which a single predetermined input is associated with the configuration of two or more emojis, from which the selection of one configuration is in dependence upon one or more selected from the list consisting of:
  i. metadata associated with the virtual environment;
  ii. metadata associated with a virtual object in the virtual environment with which the user's avatar is interacting;
  iii. metadata associated with another avatar with which the user's avatar is interacting; and
  iv. a time of day.

9. Apparatus according to claim 1, in which:
  an object in the virtual environment is associated with emotion preference metadata indicative of an emoji; and
  the image generator is responsive to interaction by the user with the object to select an emoji representing the user in accordance with the emotion preference metadata.

10. Apparatus according to claim 1, in which the image generator is configured to generate emojis representing other users within the virtual environment.

11. Apparatus according to claim 1, further comprising a memory adapted to store a look-up table associating a lexicon of predetermined physical gestures with a corresponding lexicon of emojis.

12. Apparatus according to any claim 1, further comprising a head mountable display.

13. A method of generating images representing a user of a virtual environment, the method comprising:
  using a video camera for image-based tracking of a user;
  detecting a predetermined physical gesture performed by the user in view of the video camera; and
  selecting, by an image generator, a respective emoji responsive to the predetermined physical gesture performed by the user, for display to other users,
  in which:
  the emoji representing the user is reverted to a default configuration in response to one or more selected from the list consisting of:
  i. elapse of a predetermined period of time; and
  ii. occurrence of a predetermined event other than a user selection of a facial expression.

14. A non-transitory computer-readable recording medium having computer-readable instructions stored thereon, the instructions, when executed by a computer, causing the computer to execute the method of claim 13.

15. Apparatus according to claim 5, in which:
  each of the body configurations corresponds to a single respective emoji.

16. Apparatus according to claim 5, in which:
  plural body configurations correspond to a single respective emoji.

* * * * *